United States Patent [19]

Blomley

[11] Patent Number: 4,555,596
[45] Date of Patent: Nov. 26, 1985

[54] LOUDSPEAKING TELEPHONES

[75] Inventor: Peter F. Blomley, Bishops Stortford, England

[73] Assignee: International Standard Electric Corporation, New York, N.Y.

[21] Appl. No.: 501,791

[22] Filed: Jun. 7, 1983

[30] Foreign Application Priority Data

Jun. 10, 1982 [GB] United Kingdom ............... 8216845

[51] Int. Cl.$^4$ .................. H04M 1/60; H04M 9/10
[52] U.S. Cl. ......................... 179/81 B; 179/100 L
[58] Field of Search ............ 179/81 B, 100 L, 18 BC, 179/81 R

[56] References Cited

U.S. PATENT DOCUMENTS 3,953,676 4/1976 Brown ............................. 179/81 B Primary Examiner—Gene Z. Rubinson
Assistant Examiner—James L. Dwyer
Attorney, Agent, or Firm—John T. O'Halloran; Alfred C. Hill

[57] ABSTRACT

In a loudspeaking telephone it is necessary to ensure that pick-up by the microphone of sound from the loudspeaker does not set up a howling condition. To do this it is usual to disable either the transmitting or the receiving speech channel.

To do this, the signal from each channel is applied to an analogue-digital signal envelope converter (30,31), which generates a multi-bit word representative of the current speech amplitude in its channel. Those words are applied to a comparator (32) whose output is indicative of which channel passes speech. Such a converter follows the envelope of the speech signal in its channel to produce the multi-bit word representing the current speech amplitude in its channel. The comparator's output goes via control logic (33) to two attenuators (34, 35), one in each channel. Thus only the channel which is actually passing speech, or the one with the higher speech amplitude, is enabled.

2 Claims, 5 Drawing Figures

ID TELEPHONES

This invention relates to loudspeaking or handsfree telephones.

A problem which exists when using such instruments is that the acoustic coupling between the loudspeaker and the microphone may cause a howling condition to be set up. To overcome this it is usual to ensure that only either the transmitting (microphone) channel or the receiving (loudspeaker) channel is in use at any one time, and many circuits have been produced to meet this problem. Most of these circuits such as U.S. Pat. No. 3,725,585 issued to J. Moniak et al on Apr. 3, 1973 rely on analogue techniques, and are complex.

An object of the invention is to produce a circuit for a loudspeaking telephone which is simpler and less expensive than known circuits, but which still functions well.

According to the invention there is provided an electronic circuit for use in a loudspeaking or handsfree telephone, which includes a first analogue-digital signal converter to which the signal in the telephone's transmitting channel is applied and which derives therefrom a succession of multi-bit digital combinations each representing the current amplitude of the AC signal in that channel, a second analogue-digital signal converter to which the signal in the receiving channel is applied and which derieves therefrom a succession of multi-bit digital combinations each representing the current amplitude of the AC signal in the receiving channel, a comparator to which the digital combinations derived from the two channels are applied and which derives therefrom a control output which indicates which of the two channels is passing the larger signal, and control means in each of the two channels each settable respectively to disable or enable its one of the channels, the arrangement being such that if the transmitting channel signal is larger than the receiving channel signal the transmitting channel is enabled and the receiving channel is disabled, and that if the receiving channel signal is larger than the transmitting channel signal the receiving channel is enabled and the transmitting channel is disabled.

Such an arrangement, much of which uses digital circuitry, is readily implementable in integrated circuit form.

An embodiment of the invention will now be described with reference to the accompanying drawings, in which FIG. 1 is a simplified block diagram of a loudspeaking telephone to which the invention is applicable FIG. 2 is a basic system diagram of the loudspeaking subset.

Figure 1:
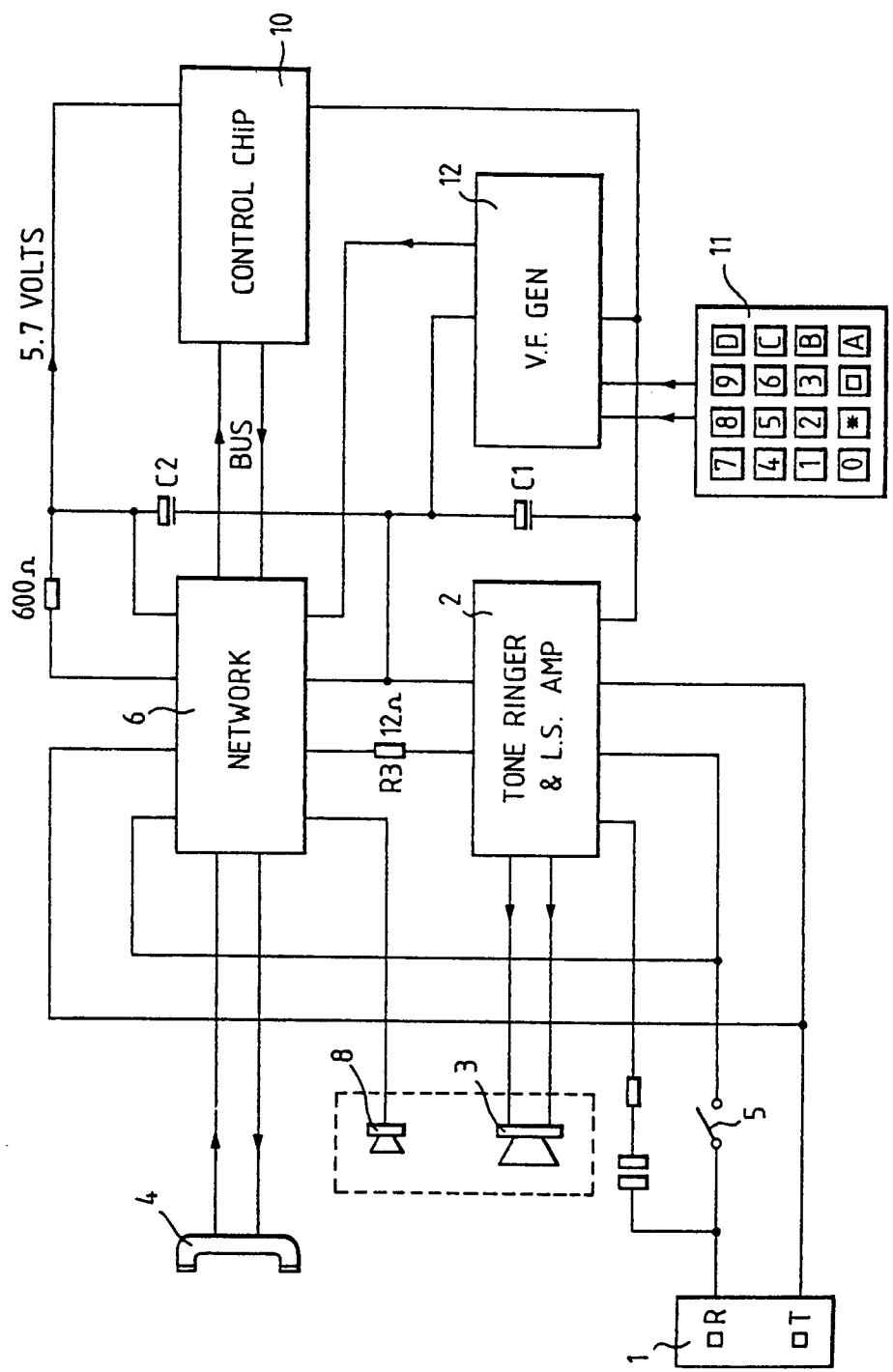

In FIG. 1, we see the line terminals R and T, indicated at 1, which are connected via a capacitor and a resistor in series to a tone ringer and loudspeaker amplifier block 2. When an AC ringing signal is received, it causes the tone ringer to respond so that a loudspeaker 3 emits the ringing signal. When the subscriber (not shown) replies by lifting the handset 4, the DC loop is completed by closure of the hook switch 5. At the exchange this causes the usual switching operation to establish the connections. Note that the hook switch contact could, if desired, be an electronic switch.

The connections from the line now extend via the block 2 to a network block 6, which contains much of the circuitry of an "electronic" telephone. The loudspeaker 3 is now disconnected from the line, and the subscriber uses the handset 4. If he wishes to use the loudspeaking (handsfree) facility he operates a switch (not shown) which causes the block 6 to connect the microphone 8 to the line, and also to enable the connection of the loudspeaker 3 to the line via the block 2.

When the loudspeaking facility is in use, it is necessary to ensure that acoustic coupling between the loudspeaker and the microphone does not cause howling. For this purpose, see below, care is taken to ensure that only one speech channel is effective, which uses the control chip 10.

FIG. 1 also includes a keypad 11 and a VF generator 12 controlled therefrom to generate VF signals for sending the wanted number digits to the line. If the exchange to which the telephone set is connected is not responsive to VF key "dialling", the VF generator 12 is replaced by an electronic "dialler" chip which converts the push-button operations into break impulses.

Figure 2:
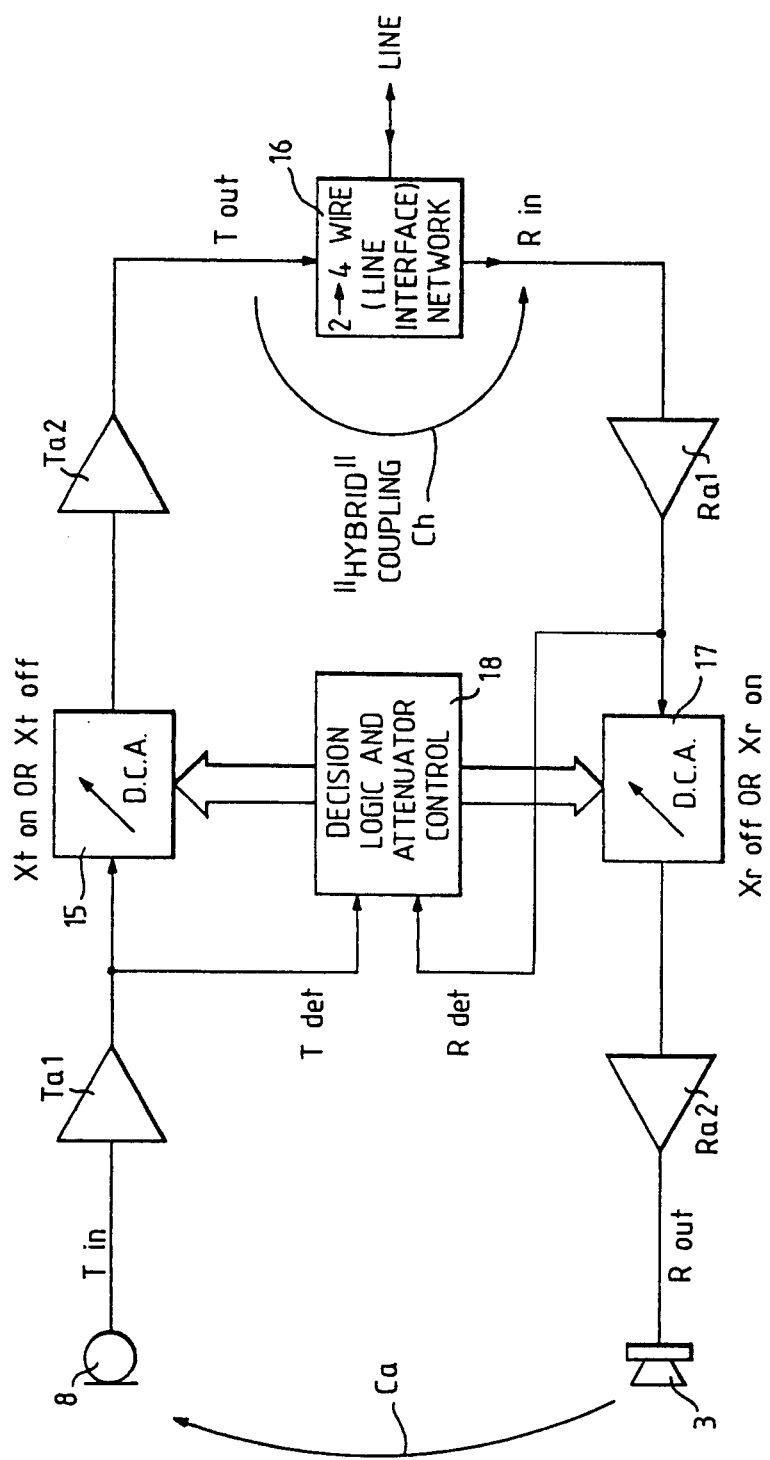

FIG. 2 shows the basic features of the loudspeaking telephone, including the microphone 8 and the loudspeaker 3, with the acoustic coupling between them indicated by the arrow Ca. Speech from the microphone 8 passes to a first transmitting amplifier Ta 1 whose output feeds a digitally-controlled attenuator 15, the output from which goes via another amplifier Ta 2 to a two wire-four wire line interface network 16, and therefrom to the line. This network 16 is an electronic equivalent of a hybrid.

Incoming speech from the line passes via the interface 16, a first receiving amplifier Ra 1, another digitally-controlled attenuator 17, and a second receiving amplifier Ra 2 to the loudspeaker 3.

The attenuators 15 and 17 are controlled by a decision logic and attenuator control block 18, which has inputs $T_{det}$ and $R_{det}$ from the transmitting and receiving channels respectively. This block contains envelope detectors, one per input and a comparator, which determines which channel is actually conveying speech. Thus if the local subscriber is talking, the attenuator 17 disables the receiving channel and the attenuator 15 enables the transmitting channel, while if the remote subscriber starts to talk and the local subscriber stops, the states of the attenuators are reversed. Thus the acoustic coupling between the loudspeaker 3 and the microphone 8 is unable to cause howling.

Figure 3:
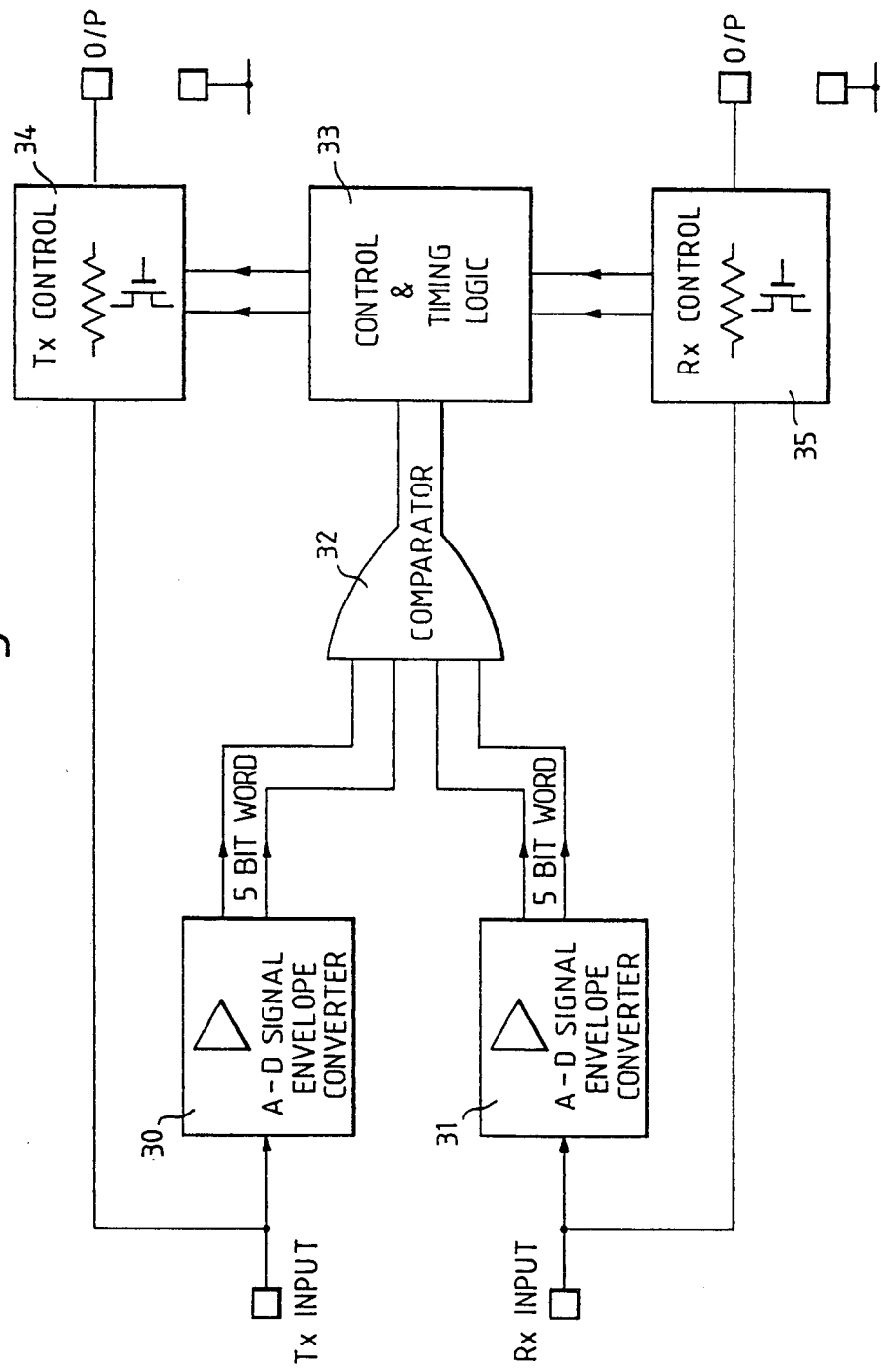
FIG. 3 is a simplified block diagram of the control chip of FIG. 2

FIG. 3 shows in more detail the contents of the block 18 of FIG. 2. Here the input from the transmitting channel is applied to an analogue-digital signal envelope converter 30. This follows the envelope of the speech signal (if any) in the transmitting channel and derives therefrom five-bit digital data words each representing speech envelope amplitude. The input from the receiver channel is applied to another converter 31, similar to the converter 30, which generates five bit words each representing the receiving channel speech signal (if any). The words from the converters 30, 31 are applied to a digital comparator 32 whose output indicates the relative speech amplitudes in the two channels. The output of the comparator 32 is applied to a control and timing logic block 33, whose outputs control transmitting and receiving channel blocks 34 and 35, which include the attenuators 15 and 17 respectively of FIG. 1. The control blocks 34 and 35 also have applied to them the speech signals as received from the two speech channels, and it is the speech conveyed via these connection which is disabled or enabled under control of the block 33.

Thus whenever a change in the relative amplitude of speech channel signals occurs, one or other of the controls 34 or 35 is rendered effective so that only one speech channel functions at once. As will be seen, the logic 33 can, if desired, introduce delay into the enablement of disablement or the attenuators in either or both of the blocks 34, 35.

Figure 4:
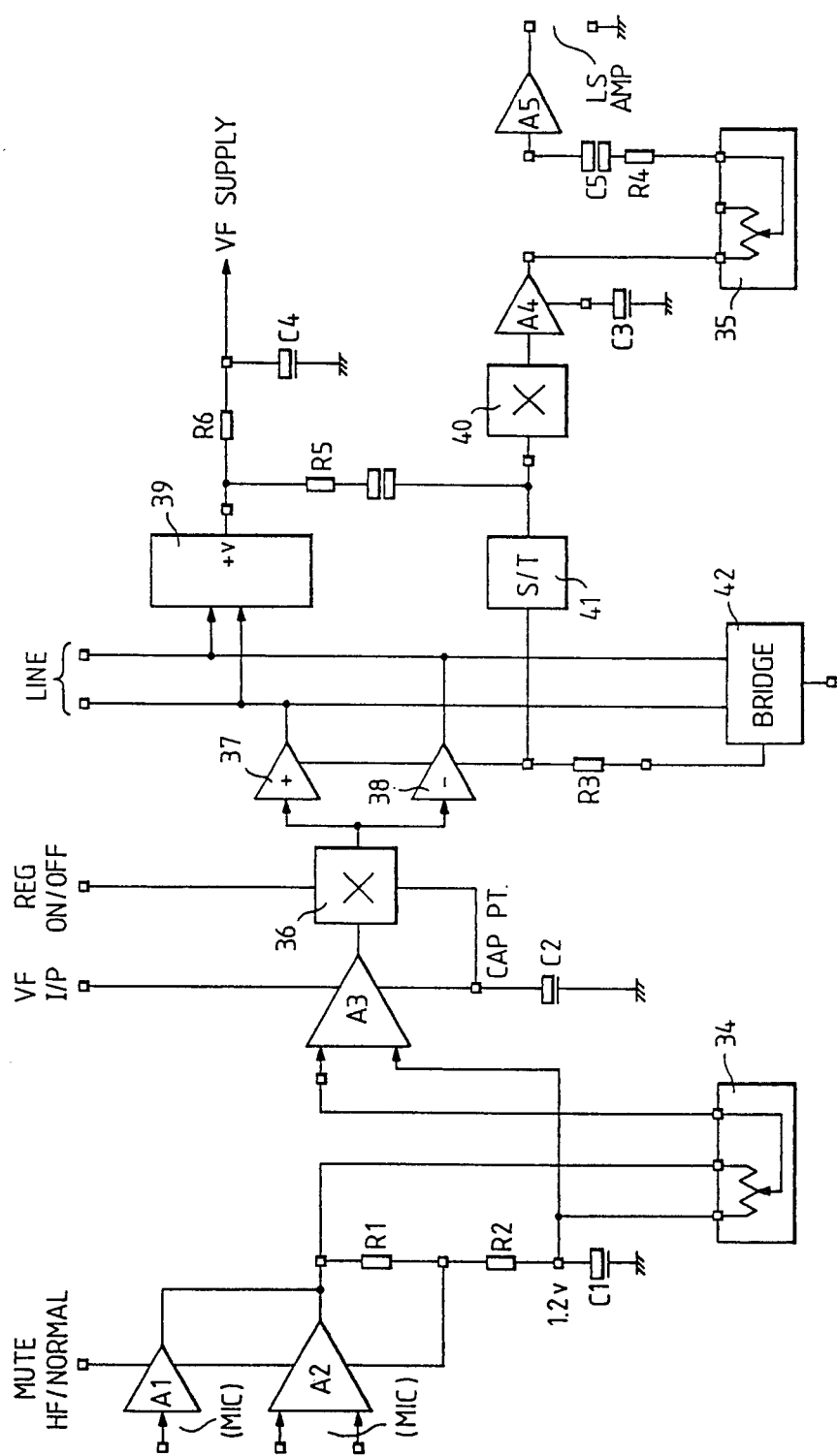
FIG. 4 shows in essence the circuitry of the network chip of FIG. 2

FIG. 4 shows what is in the network chip 6, FIG. 1 and the two speech channels will be described separately. The speech to be transmitted is applied from the loudspeaking telephone's microphone to the amplifier A1, or from the handset microphone to the amplifier A2, depending on which one is in use. The amplifier A2 corresponds to the amplifier Ta1, FIG. 2. The MUTE input is used to disable the amplifiers A1 and A2 when VF signalling is in progress, as when "dialling". The output of the amplifier in use, whether it is A1 or A2, is applied to an impedance network R1-R2-C1, with R1-R2 shunted by a variable resistor in the box 34, which represents the digitally-controlled attenuator in the outgoing speech path. The signal at the midpoint of this variable resistor is applied to the input of an amplifier A3, which corresponds to Ta2 of FIG. 2. This has a VF input, to which VF signals are applied when "dialling", at which time A1 and A2 are muted.

The output of the amplifier A3 is applied to a so-called multiplier 36 whose other input is a regulation input for line regulation. Thus the effective amplitude of the signal applied to the line is varied in accordance with line length. The output from the multiplier 36 is applied to drive amplifiers 37 and 38, and these drive the line wires.

Incoming speech from the line is applied via a bridge amplifier 39, which may be a circuit of the type described and claimed in U.S. Pat. No. 4,286,123 issued to me on Aug. 25, 1981, to another multiplier 40, which in turn feeds an amplifier A4, which corresponds to Ra1 of FIG. 2. This feeds another amplifier A5, which corresponds to Ra2 of FIG. 2, via a variable resistor in the box 35, which represents the digitally controlled attenuator in the receiving path.

The sidetone network 41 is coupled between the drive amplifiers 37, 38 and the multiplier 40, and its action is analogous to that of the hybrid in a conventional telephone circuit. Thus signals across the line are only effectively applied to the drive 40 if they are genuinely incoming signals. If they are due to the local talker an antiphase drive occurs to cause signal cancellation. The bridge amplifier 39 has a second output, via R6-C4, which provides a DC supply for the VF generator in block 12, FIG. 1.

The final item in FIG. 4 is a so-called negative bridge 42 which switches the negative wire of the line, whichever wire is in fact negative, to its output to provide a DC supply for the instrument.

Figure 5:
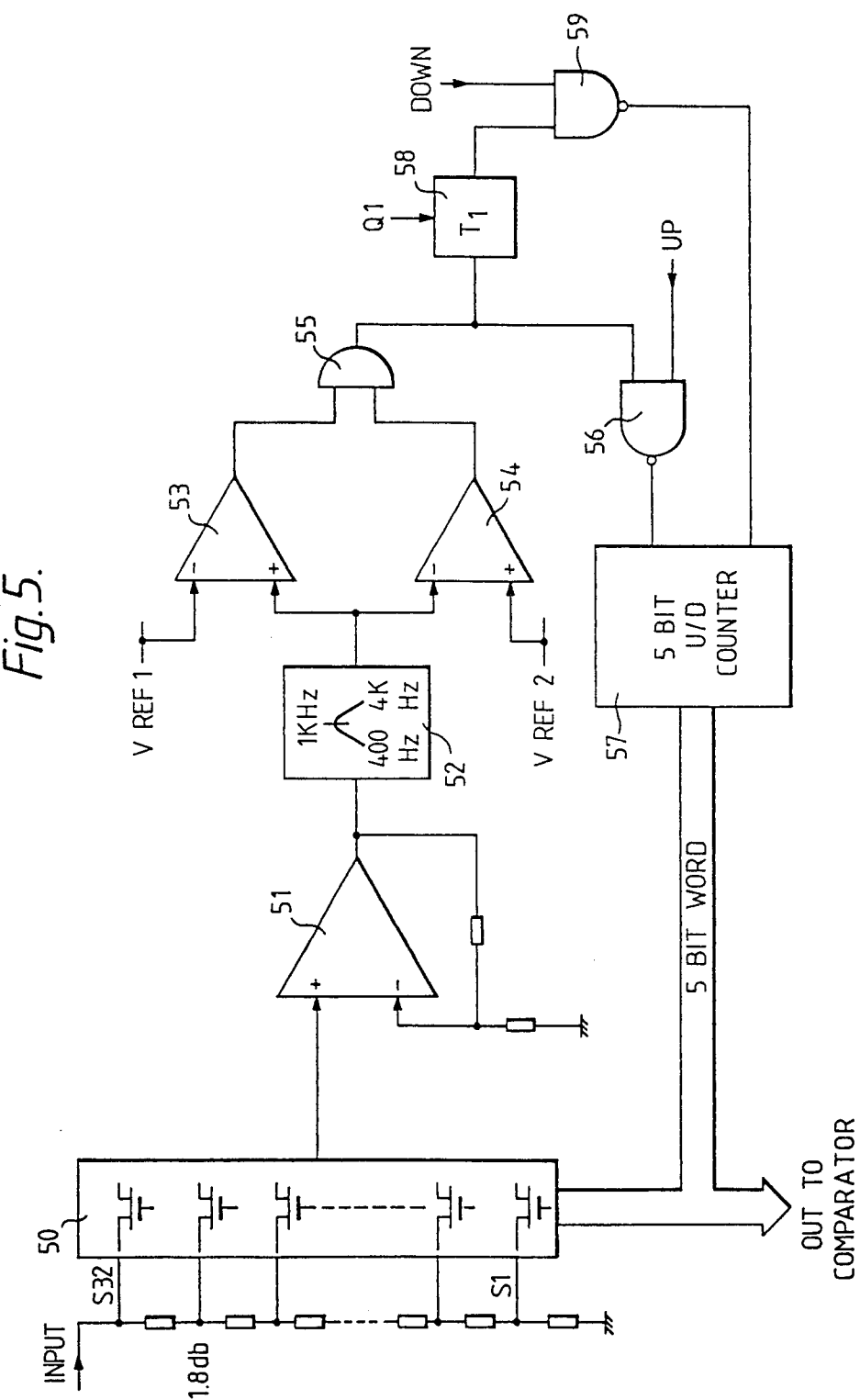
FIG. 5 is a block diagram explanatory of the analogue-digital signal converter used in FIG. 2.

FIG. 5 shows one of the analogue-digital signal envelope convertors, the function of which is to produce as its output to the comparator a succession of five-bit words each representative of the amplitude of a speech signal applied to its input, whether positive or negative. This input is applied to a chain of resistors which, with a set of 32 analogue gates 50 form an attenuator. At any one time, one of these gates is open to pass a signal to a buffer amplifier 51, the gate which is open being dependent on the signal amplitude.

The output of the amplifier 51 is applied to a band-pass filter 52, set for the pass band 400 Hz to 4000 Hz, the output of which is applied to two comparators 53 and 54. These comparators are operational amplifiers, and the filter output is applied to the + input of amplifier 53, where it is compared with $V_{ref1}$, and to the − input of the amplifier 54, where it is compared with $V_{ref2}$. Thus if the signal amplitude varies from the amplitude defined by the two voltage references, one of the comparators gives an output, which is applied to an OR gate 55.

The OR gate output is applied direct to one input of a NAND gate 56, the other input of which is a fast clock input UP. Thus any increase in the signal amplitude causes the setting of a counter 57 to be increased by 1, and the output of this counter provides the next one of the five-bit words which is applied to the five-bit comparator 32 (FIG. 3). This five bit word also adjusts the setting of the gate array 50.

If the amplitude falls, then gate 56 is closed and the counter is "back-stepped" by unity.

The output of the gate 55 is also applied via a clock-controlled delay 58 to one input of another NAND gate 59. The other input of this gate is a slow clock input labelled DOWN, which allows the counter to follow the amplitude of the signal in the monitored channel if no signal is present.

I claim:

1. An electronic circuit for use in a loudspeaking of handsfree telephone comprising a transmit channel and a receive channel, said circuit including a first analogue-digital signal converter to which analogue voice frequency signals in the telephone's transmitting channel are applied and said converter derives therefrom a succession of multi-bit digital combinations each representing the current amplitude of the voice frequency signal in that channel, a second analogue-digital signal converter to which a signal from the receiving channel is applied and which derives therefrom a succession of multi-bit digital combinations each representing the current amplitude of the voice frequency signal in the receiving channel, a comparator to which the digital combinations derived from the two channels are applied and which derives therefrom a control output which indicates which of the two channels is passing the larger signal, and control means in each of the two channels each settable respectively to disable or enable its one of the channels, the arrangement being such that if the transmitting channel signal is larger than the receiving channel signal the transmitting channel is enabled and the receiving channel is disabled, and that if the receiving channel signal is larger than the transmitting channel signal the receiving channel is enabled and the transmitting channel is disabled.

2. An electronic circuit as claimed in claim 1, and in which the control means in each of the two channels is an attenuator whose setting is adjusted under control of the output of the comparator.

* * * * *